Oct. 17, 1933.　　　　D. J. CONANT　　　　1,930,508
ENGINE COOLING SYSTEM
Filed Feb. 20, 1932
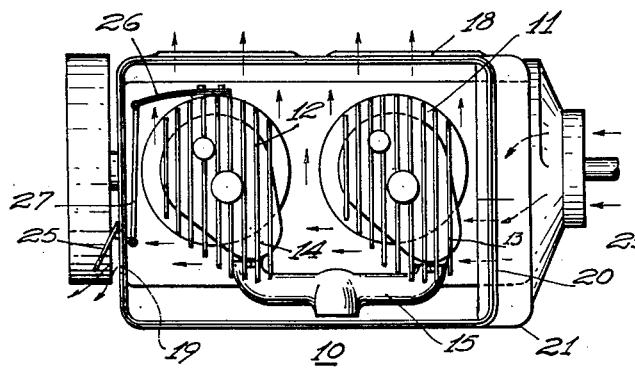
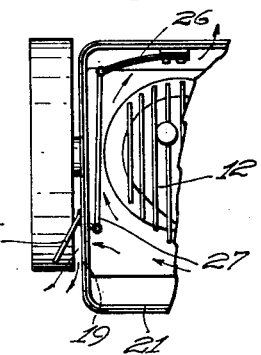
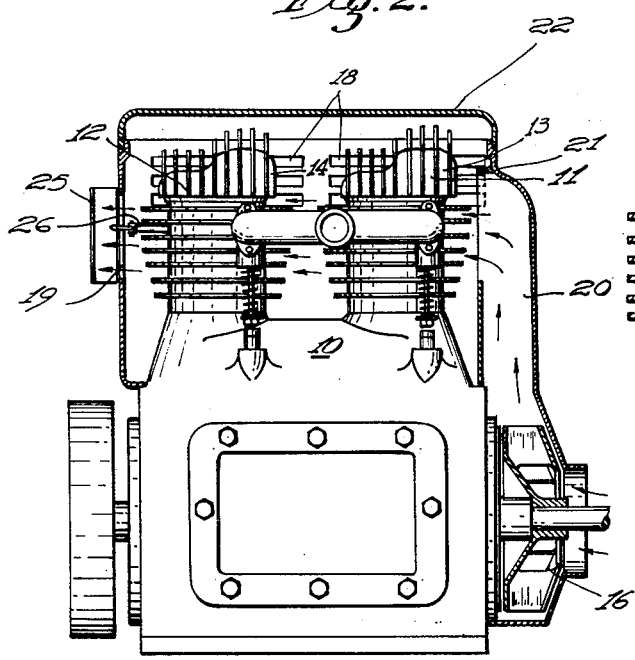
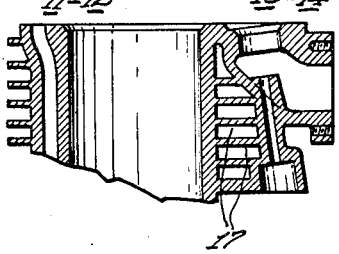
WITNESSES:
E. C. Liding
George V. Woodling
INVENTOR
David J. Conant
BY W. R. Coley
ATTORNEY Patented Oct. 17, 1933

1,930,508

UNITED STATES PATENT OFFICE 1,930,508

ENGINE COOLING SYSTEM

David J. Conant, Memphis, Tenn., assignor to Westinghouse Electric & Manufacturing Company, a corporation of Pennsylvania Application February 20, 1932. Serial No. 594,169

9 Claims. (Cl. 123—171)

My invention relates generally to cooling systems and particularly to air-cooling systems for internal combustion engines and the like.

It is an object of my invention to provide a cooling system for an internal combustion engine and the like that shall be simple and efficient in operation and be readily and economically manufactured.

A further object of my invention is to provide for cooling an internal combustion engine or the like, in accordance with the amount of heat developed by the engine.

A more specific object of my invention is to provide for continuously directing a cooling medium to intimately contact with the region surrounding the exhaust valve chamber of an air-cooled engine and for periodically directing the said medium to intimately contact with the region surrounding the cylinders whenever the operating temperature of the cylinders attains a predetermined value.

It is also an object of my invention to provide for bringing a cool blast of air directly in contact with the region surrounding the exhaust valve chamber before surging about the cylinder walls, thereby maintaining the temperature of the region surrounding the exhaust valve chamber substantially the same as the cylinder walls.

Other objects of the invention will hereinafter become apparent. For a fuller understanding of the nature and the objects of my invention, reference should be had to the following detailed description, taken in connection with the drawing, in which:

Figure 1 represents a plan view of an internal combustion engine embodying a cooling system constructed in accordance with my invention;

Fig. 2 is a side elevational view of an internal combustion engine embodying a cooling system constructed in accordance with my invention;

Fig. 3 is a fragmentary plan view of an internal combustion engine showing a modified form of my cooling system;

Fig. 4 is a fragmentary cross-sectional view of one of the cylinders of an internal combustion engine, showing particularly the air ducts provided between the exhaust valve chamber and the cylinder.

Referring more particularly to the drawing, the reference character 10 designates an internal combustion engine having two cylinders 11 and 12 to which my cooling system may be applied. Although I have shown an engine having two cylinders, it will be understood that my cooling system may be readily applied to an engine having any number of cylinders. The cylinders 11 and 12 are preferably integrally formed with the exhaust valve chambers 13 and 14, respectively.

Generally, the cooling system comprises a housing 21 having an air inlet passage 20 that is in direct communication with a fan 16 and outlets 18 and 19. Also, as illustrated, the outlet 19 is provided with a hinged-door 25 that is actuated by a thermostat 26 by means of a control rod 27.

The cylinders 11 and 12 are provided with the usual fins in order to provide a larger cooling surface for dissipating the heat generated by the engine. Moreover, in order to provide as much cooling surface as possible, the space between the exhaust valve chambers 13 and 14 and the cylinders 11 and 12 are provided with air ducts 17 (see Fig. 4). This not only provides more cooling surface for dissipating the heat but also isolates the exhaust valve chambers as much as possible from the cylinders. This means that the intense heat to which the exhaust valve chambers are subjected will not be conducted to the cylinders walls as much as it would be if the air ducts 17 were not provided.

Preferably, as shown, the thermostat 26 is mounted on the side of the cylinder 12 that is opposite from the exhaust valve chamber 14. In this manner, the movements of the free-end of the thermostat 26 are responsive only to the temperature of the cylinder 12 and not to the temperature of the exhaust valve chamber 14. The free-end of the thermostat 26 is connected to the hinged-door 25 by means of a connecting bar 27. When the temperature of the cylinder 12 is below a predetermined value, the free-end of the thermostat 26 biases the door 25 to the open position. Therefore, it will be readily observed that, as the temperature of the cylinder 12 gradually increases, the free-end of the thermostat 26 gradually moves to close the door 25, and, eventually, when the temperature reaches, a predetermined value, the opening 19 is completely closed by the door 25.

The housing 21 that incloses the cylinder is provided with a removable cover 22 in order to afford easy access to the engine for maintenance. The fixed outlets 18 that comprise a plurality of longitudinal openings are positioned on the side of the housing that is opposite to the exhaust valve chambers 13 and 14 and they constitute the only means through which the cooling medium is discharged from the housing when the outlet 19 is closed by the door 25.

The air inlet passage 20 that is provided in one end of the housing 21, is in direct communication with the fan 16 that is driven by the engine, and it provides for directing a blast of cool air into the housing 21.

It will be observed that the position of the exit end of the air inlet passage 20 is such that when the temperature of the cylinder 12 is below a predetermined point, that is, when the outlet 19 is open, substantially all of the air passes through the air ducts 17 and intimately contacts with the exhaust valve chambers 13 and 14 and that part of the cylinders adjacent thereto and, hence, passes to atmosphere through the outlet 19. However, as the temperature of the cylinder 12 increases, as it will do since substantially all of the air is utilized for cooling the exhaust valves, the free-end of the thermostat gradually moves the door 25 to close the outlet 19, thereby gradually deflecting a greater part of the air, upon its leaving the exhaust valve chambers 13 and 14 and that part of the cylinders adjacent thereto, into intimate contact with the remaining part of the cylinders, and thence out to atmosphere through the fixed outlets 18. When the outlet 19 is completely closed by the door 25, as governed by a predetermined temperature of the cylinder 12, all of the air is deflected out to atmosphere through the outlets 18.

Under this condition, since all of the cooling medium is directed into intimate contact with the cylinders as well as the exhaust valves, the temperature of the cylinders decreases. Thus, the free-end of the thermostat 26 gradually moves to open the door 25 and permit part of the cooling medium to escape to atmosphere through the outlet 19. In this manner, the action of the cooling system is such as to regulate the cooling of the cylinders in accordance with the heat developed by the engine.

Moreover, in this connection, it is to be noted that my cooling system provides for continuously directing a blast of cool air, as it is forced from the fan 16, first into intimate contact with the exhaust valve chambers 13 and 14 and that part of the cylinders adjacent thereto, regardless of whether or not the outlet 19 is closed by the door 25. In this manner, the temperature of the exhaust valve chambers and that part of the cylinders adjacent thereto, which constitute the hottest part of the cylinder, is cooled more than the remaining part of the cylinders, with the result that all parts of the cylinders are maintained at substantially the same temperature.

In Fig. 3, I have shown a modified form of my invention in that the thermostat 26 which controls the operation of the door 25 is mounted on the housing 21. In this manner, the movements of the free-end of the thermostat are responsive to the temperature of the cooling medium surrounding the cylinder 12. Otherwise, the operation of my control system is the same as that previously explained when the thermostat is mounted on the cylinder 12.

I have thus disclosed a cooling system that may be utilized in connection with the internal combustion engine that provides for regulating the temperature of the cylinders in accordance with the heat developed as well as for maintaining the temperature of the exhaust valve chambers substantially the same as the other parts of the cylinder.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. A cooling system for internal combustion engines and the like comprising, in combination, a cylinder having an exhaust valve chamber along one side thereof, means for circulating a cooling medium for cooling the cylinder and the exhaust valve chamber and means for directing substantially all of the cooling medium in intimate contact with only the exhaust valve chamber and that part of the cylinder that is adjacent thereto, when the temperature of the cylinder is below a predetermined value.

2. A cooling system for internal combustion engines and the like comprising, in combination, a cylinder having parts that are subjected to different temperatures, means for establishing a cooling medium, a housing having an inlet and two outlets for enclosing the cylinder, means for directing the cooling medium into said housing, and means for causing the cooling medium to leave said housing through the two outlets when the temperature is below a predetermined value and for causing it to leave through one of said outlets when the temperature is above said predetermined value.

3. A cooling system for internal combustion engines and the like comprising, in combination, a cylinder, means for establishing a cooling medium, a housing having an inlet and two outlets for enclosing the cylinder, means responsive to the temperature of the cylinder for varying the degree of opening of one of the said outlets and means for directing the cooling medium into said housing through said inlet.

4. A cooling system comprising, in combination, a cylinder, a housing having an inlet and two outlets for enclosing said cylinder, means for supplying a cooling medium into said housing and means for regulating the amount of cooling medium leaving the housing through each outlet in accordance with the temperature of the cylinder.

5. A cooling system comprising, in combination, a cylinder having an exhaust valve chamber integrally formed on one side thereof, a housing having an inlet and two outlets for enclosing said cylinder, means responsive to the temperature of the cylinder for closing the opening of one of the said outlets when the temperature is above a predetermined value, and means for introducing a cooling medium into said housing through said inlet, the position of the inlet and the said outlet that is provided with a closing means being such that the cooling medium passes directly into intimate contact with the exhaust valve chamber and out to atmosphere through said outlet when the temperature is below said predetermined value.

6. A cooling system comprising, in combination, a cylinder having an exhaust valve chamber integrally formed on one side thereof and having cooling ducts between said cylinder and said chamber, a housing having an inlet a fixed outlet and a second outlet for enclosing said cylinder, means for closing the opening of the second outlet, a thermostat mounted on said cylinder for actuating said closing means, the action of the said thermostat being such that the said outlet is open when the temperature of the cylinder is below a predetermined value, and means for introducing a cooling medium into said housing through said inlet, the position of the inlet and the second outlet being such that the cooling medium passes directly into intimate contact with said exhaust valve chamber and through said cooling ducts, and hence out to atmosphere through the second outlet when the temperature is below said predetermined value.

7. A cooling system comprising, in combination, a cylinder having an exhaust valve chamber integrally formed on one side thereof, a housing having an inlet, a fixed outlet and a second outlet for enclosing said cylinders, means for closing the opening of the second outlet, a thermostat mounted on said cylinder for actuating said closing means, the action of the thermostat being such that the said outlet is closed when the temperature of the cylinder is below a predetermined value, and means for introducing a cooling medium into said housing through said inlet, the postion of the inlet being such that the cooling medium passes directly into intimate contact with the said exhaust valve chamber and that part of the cylinder adjacent thereto and hence past the remaining part of the cylinder before leaving the housing when the said second outlet is closed.

8. A cooling system comprising, in combination, a cylinder having an exhaust valve chamber integrally formed on one side thereof, a housing having an inlet a fixed outlet and a second outlet for enclosing said cylinders, means for closing the opening of the second outlet, a thermostat mounted on said housing and disposed to be influenced by the medium surrounding the cylinder for actuating said closing means, the action of the thermostat being such that the said outlet is closed when the temperature of the medium surrounding the cylinder is above a predetermined value, means for introducing a cooling medium into said housing through said inlet, the position of the inlet being such that the cooling medium passes directly into intimate contact with the said exhaust valve chamber and that part of the cylinder adjacent thereto and hence past the remaining part of the cylinder before leaving the housing when the said second outlet is closed.

9. A cooling system comprising, in combination, a cylinder having an exhaust valve chamber integrally formed on one side thereof, and having cooling ducts between said cylinder and said chamber, a housing having an inlet a fixed outlet and a second outlet for enclosing said cylinder, means for closing the opening of the second outlet, a thermostat mounted on said housing and disposed to be influenced by the medium surrounding the cylinder for actuating said closing means, the action of the said thermostat being such that the said outlet is open when the temperature of the cylinder is below a predetermined value, and means for introducing a cooling medium into said housing through said inlet, the position of the inlet and the second outlet being such that the cooling medium passes directly into intimate contact with said exhaust valve chamber and through said cooling ducts and hence out to atmosphere through the second outlet when the temperature of the medium surrounding the cylinder is below said predetermined value.

DAVID J. CONANT.